(12) United States Patent
Lay et al.

(10) Patent No.: US 12,577,136 B2
(45) Date of Patent: Mar. 17, 2026

(54) WASTEWATER TREATMENT SYSTEM INCLUDING A MOVING BED ASSEMBLY

(71) Applicant: K&L Equipment, LLC, Washington, MO (US)

(72) Inventors: Jeremey Lay, Washington, MO (US); Benjamin Kuenzel, Washington, MO (US)

(73) Assignee: K&L Equipment, LLC, Washington, MO (US)

( * ) Notice: Subject to any disclaimer, the term of this patent is extended or adjusted under 35 U.S.C. 154(b) by 0 days.

(21) Appl. No.: 18/658,569

(22) Filed: May 8, 2024

(65) Prior Publication Data

US 2024/0400429 A1 Dec. 5, 2024

Related U.S. Application Data

(60) Provisional application No. 63/505,871, filed on Jun. 2, 2023.

(51) Int. Cl.
C02F 3/08 (2023.01)
C02F 3/20 (2023.01)

(52) U.S. Cl.
CPC ............... C02F 3/085 (2013.01); C02F 3/20 (2013.01); *C02F 2203/008* (2013.01)

(58) Field of Classification Search
CPC .............. C02F 3/085; C02F 3/10; C02F 3/20
USPC ........................................................ 210/601
See application file for complete search history.

(56) References Cited

U.S. PATENT DOCUMENTS

| | | | |
|---|---|---|---|
| 4,995,980 | A | 2/1991 | Jaubert |
| 5,500,119 | A | 3/1996 | Jenelle |
| 5,549,828 | A | 8/1996 | Ehrlich |
| 5,718,823 | A | 2/1998 | Tomita et al. |

(Continued)

FOREIGN PATENT DOCUMENTS

| | | |
|---|---|---|
| CA | 2952680 C | 7/2023 |
| CN | 103896454 A | 7/2014 |

(Continued)

OTHER PUBLICATIONS

Cao et al, English machine translation CN 215855334 U, pp. 1-4 (Year: 2022).*

(Continued)

*Primary Examiner* — Claire A Norris
(74) *Attorney, Agent, or Firm* — Armstrong Teasdale LLP

(57) ABSTRACT

A moving bed assembly for use in an aqueous environment includes a frame housing, a retention screen coupled to the frame housing and extending at least partially across one side of the frame housing, where the frame housing and the retention screen cooperatively defining an interior of the moving bed assembly, and biocarrier media retained within the interior. The assembly further includes a diffuser coupled to the frame housing and configured to direct bubbles into the interior of the housing to agitate the media within the interior when the assembly is in the aqueous environment. The assembly has a density greater than a density of fluid in the aqueous environment such that the moving bed assembly is configured to be submerged and a fill ratio of a volume of the biocarrier media to a total volume of the interior of the moving bed assembly is between 30% and 70%.

13 Claims, 7 Drawing Sheets

(56) References Cited

U.S. PATENT DOCUMENTS

| | | |
|---|---|---|
| 6,348,147 B1 | 2/2002 | Long |
| 7,252,766 B2 | 8/2007 | Stuth, Sr. et al. |
| 7,445,715 B2 | 11/2008 | Pehrson et al. |
| 7,691,262 B2 | 4/2010 | Pehrson et al. |
| D618,760 S | 6/2010 | Flournoy et al. |
| 7,862,711 B2 | 1/2011 | Han |
| D672,009 S | 12/2012 | Flournoy et al. |
| D718,412 S | 11/2014 | Flournoy et al. |
| 8,992,772 B2 | 3/2015 | Kaw |
| 9,206,059 B2 | 12/2015 | Brouwer et al. |
| D762,279 S | 7/2016 | Flournoy et al. |
| 9,598,296 B2 | 3/2017 | Tharp et al. |
| 9,850,149 B2 | 12/2017 | Fulford |
| 9,938,173 B2 | 4/2018 | Wang |
| 9,969,635 B2 | 5/2018 | Kaldate et al. |
| 10,005,683 B2 | 6/2018 | Wett et al. |
| D827,765 S | 9/2018 | Ward |
| 10,954,147 B2 | 3/2021 | Labrecque |
| 11,034,601 B1 * | 6/2021 | McGuigan ............... C02F 3/20 |
| 11,358,890 B2 | 6/2022 | Boutet et al. |
| 2005/0269262 A1 | 12/2005 | McBride |
| 2007/0102354 A1 | 5/2007 | Flournoy et al. |
| 2008/0073270 A1 | 3/2008 | Smith |
| 2016/0002078 A1 * | 1/2016 | Magen ...................... C02F 3/20 |
| | | 210/615 |
| 2020/0095146 A1 | 3/2020 | Lemaire et al. |
| 2020/0290908 A1 | 9/2020 | Gencer et al. |
| 2021/0047211 A1 | 2/2021 | Otis et al. |
| 2021/0276902 A1 | 9/2021 | Neu et al. |
| 2023/0002258 A1 | 1/2023 | Basu et al. |
| 2023/0219833 A1 | 7/2023 | Lohan |

FOREIGN PATENT DOCUMENTS

| | | | |
|---|---|---|---|
| CN | 106145364 A | | 11/2016 |
| CN | 208104032 U | | 11/2018 |
| CN | 109052804 A | | 12/2018 |
| CN | 109205789 A | | 1/2019 |
| CN | 111039497 A | | 4/2020 |
| CN | 211311034 U | | 8/2020 |
| CN | 213708062 U | | 7/2021 |
| CN | 215855334 U | * | 2/2022 |
| CN | 114853259 A | | 8/2022 |
| CN | 115432891 A | * | 12/2022 |
| CN | 115947448 A | | 4/2023 |
| CN | 116239218 A | | 6/2023 |
| EP | 1934146 B1 | | 4/2013 |
| EP | 2496528 B1 | | 8/2016 |
| JP | 2018001163 A | | 1/2018 |
| KR | 100649099 B1 | | 11/2006 |
| KR | 101320065 B1 | | 10/2013 |
| KR | 1020150016775 A | | 2/2015 |
| TW | 593166 B | | 6/2004 |
| WO | 2012161339 A1 | | 11/2012 |
| WO | 2015164444 A2 | | 10/2015 |
| WO | 2016159870 A1 | | 10/2016 |
| WO | 2017103312 A1 | | 6/2017 |

OTHER PUBLICATIONS

Li et al, English machine translation, CN 115432891 A, pp. 1-5 (Year: 2022).*

* cited by examiner

WASTEWATER TREATMENT SYSTEM INCLUDING A MOVING BED ASSEMBLY

CROSS REFERENCE TO RELATED APPLICATIONS

This application claims priority to U.S. Provisional Patent Application No. 63/505,871, filed Jun. 2, 2023, the disclosure of which is incorporated herein by reference in its entirety.

BACKGROUND

The present disclosure relates generally to wastewater treatment systems and, more specifically, to modular moving bed assemblies for use in wastewater treatment systems.

At least some wastewater treatment systems utilize a biological process for the treatment of wastewater. Some known biological treatment systems utilize a media having a biological film that allows for biological growth on the media to provide the treatment to the wastewater. One known treatment includes a moving bed biological film reactor ("MBBR") having loose media received within a containment tank or MBBR tank designed to perform the MBBR process. Typically, in such systems, wastewater or the fluid to be treated is directed into the MBBR tank. The wastewater is held in the MBBR tank and mixed with a biological media to treat the wastewater. As a result, known MBBR systems utilize a separate MBBR tank for retaining free floating biological media and are not suited for use in larger open air water treatment reservoirs, such as water treatment lagoons. Additionally, because such systems rely on an independent dedicated MBBR tank to contain the media and perform the MBBR treatment, the expense and floor space required to perform the MBBR treatment is increased.

BRIEF DESCRIPTION

In one aspect, a moving bed assembly for use in an aqueous environment includes a frame housing, a retention screen coupled to the frame housing and extending at least partially across one side of the frame housing, where the frame housing and the retention screen cooperatively defining an interior of the moving bed assembly, and biocarrier media retained within the interior. The assembly further includes a diffuser coupled to the frame housing and configured to direct bubbles into the interior of the housing to agitate the media within the interior when the assembly is in the aqueous environment. The assembly has a density greater than a density of fluid in the aqueous environment such that the moving bed assembly is configured to be submerged and a fill ratio of a volume of the biocarrier media to a total volume of the interior of the moving bed assembly is between 30% and 70%.

In another aspect, a method of treating fluid in a reservoir includes filling an interior of a moving bed assembly with a biocarrier media. The moving bed assembly includes a frame housing, a retention screen coupled to the frame housing and extending at least partially across one side of the frame housing, the frame housing and the retention screen cooperatively defining the interior of the moving bed assembly. A fill ratio of a volume of the biocarrier media to a total volume of the interior of the moving bed assembly is between 30% and 70%. The method further includes sinking the moving bed assembly in the reservoir such that the moving bed assembly is rested in position within the reservoir and supplying, after said sinking, air from a diffuser to the interior of the moving bed assembly, the diffuser being coupled to the frame housing, wherein the supply of air agitates the biocarrier media within the interior of the moving bed assembly.

In yet another aspect, a moving bed assembly for use in an aqueous environment includes a frame housing and a retention screen coupled to the frame housing and extending at least partially across one side of the frame housing, the frame housing and the retention screen cooperatively defining an interior of the moving bed assembly, the retention screen configured to retain a biocarrier media within the interior. The assembly further includes a diffuser coupled to the frame housing configured to direct bubbles into the interior of the frame housing to agitate the biocarrier media within the interior when the moving bed assembly is in the aqueous environment. The moving bed assembly has a density greater than a density of fluid in the aqueous environment such that the moving bed assembly is configured to be submerged in the aqueous environment. The moving bed assembly is configured to perform a moving bed biological reactor ("MBBR") treatment to the fluid of the aqueous environment.

DETAILED DESCRIPTION

The example systems and methods described herein overcome disadvantages of known wastewater systems by enabling a biological reaction treatment to be performed by a mobile and modular unit, without requiring the separate construction of a surrounding tank, such as an MBBR tank, adapted for the treatment. For example, some embodiments described herein include a moving bed assembly with retention screens on one or more sides of frame. The moving bed assembly is loaded with a biological media and introduced into an open aqueous environment, such as a water treatment lagoon. The retention screens retain the media within the moving bed assembly while allowing for the flow of wastewater into and out of the moving bed assembly. The moving bed assembly further includes coarse bubble diffusers which induce a turbulent and mixing fluid flow in the lagoon around and within the moving bed assembly. Bubbles from the coarse bubble diffusers provide continuous agitation to the carrier media to promote attachment and growth of biological microorganisms in the wastewater thereon.

Figure 1:
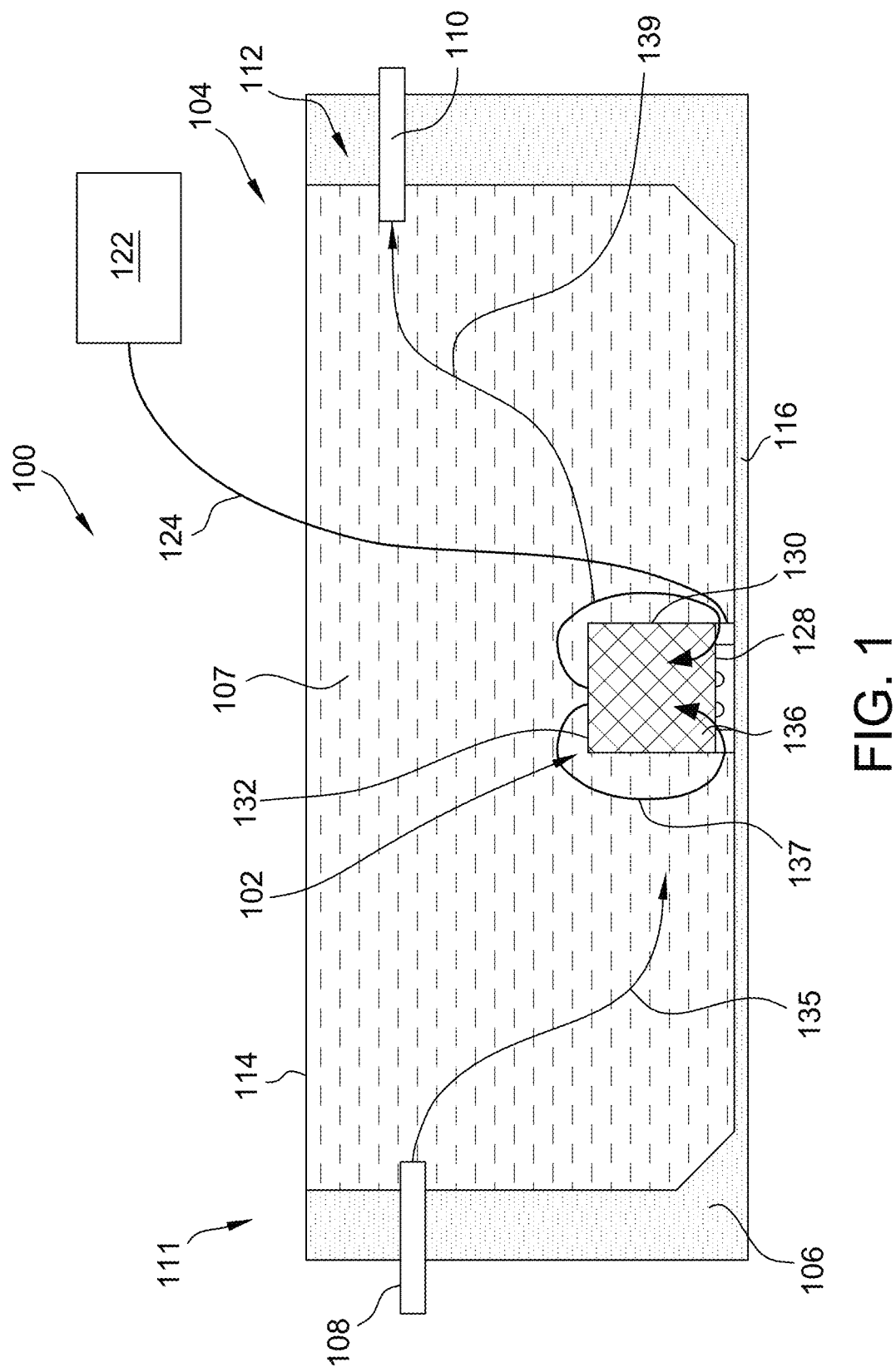
FIG. 1 is a schematic of an example wastewater treatment system including a moving bed assembly.

FIG. 1 is a schematic view of a wastewater treatment system 100 including a moving bed assembly 102, alternatively referred to herein as a "biological reactor assembly."

In the example embodiment, the wastewater treatment system 100 includes an in-ground man made reservoir tank 104, also referred to herein as a "reservoir" or "lagoon", that is bounded by a barrier 106, such as concrete, steel, or earthen walls. Untreated wastewater flows into the reservoir at an inlet 108 or "influent pipe" at a first end 111 of the reservoir 104 and the treated water exits the reservoir 104 at an outlet 110 or "effluent pipe" at an opposed second end 112 of the reservoir 104. In other embodiments the moving bed assembly 102 may be used in any wastewater treatment environment such as, but not limited to, pre-equalization tanks, pre-aeration tanks, roughing tanks, pre-treatment tanks, centrate treatment tanks, activated sludge facilities, recirculating sand filters, or in post-aeration unit processes.

The moving bed assembly 102 is positioned within the reservoir 104. The moving bed assembly 102 is a self-contained moving bed biological reactor ("MBBR"). The moving bed assembly 102 provides a biological water treatment to the untreated wastewater within the reservoir 104. Treatment processes performed by the moving bed assembly 102 may include, for example and without limitation, Biochemical Oxygen Demand ("BOD") removal, Chemical Oxygen Demand ("COD") removal, Nitrification, Denitrification, and/or any other suitable MBBR treatments. The moving bed assembly 102 includes a porous retention screen 136 that allows the flow of water 107 in the reservoir 104 to pass through the moving bed assembly 102, while retaining biocarrier media 120 (shown in FIG. 2), also referred to herein as "media", within the moving bed assembly 102.

The moving bed assembly 102 is a mobile and modular unit, in that it may be moved within and in and out of the reservoir 104. The moving bed assembly 102 has a density that is greater than the density of water within the reservoir 104, causing the assembly 102 be submerged within the aqueous environment (i.e., below a water line 114 of the fluid in the reservoir 104). In the example embodiment, the assembly 102 is configured to fully sink and rest on a bed 116 of the reservoir 104. In other embodiments, the assembly 102 may be sized such that the assembly 102 sinks and/or is positioned at rest in the aqueous environment, but is not fully submerged. For example, in some embodiments, the assembly 102 may be sized and/or positioned to extend at least partially above the water line 114 of the environment and may be retrievable from the surface by a cover 148 (shown in FIG. 7) of the assembly 102.

The media 120 (shown in FIG. 2) has a density that is lighter than water in the absence of aeration. In some embodiments the moving bed assembly 102 further includes a flotation marker (not shown), such as a buoy attached to the moving bed assembly 102 by a cord or line, to provide a visual indication from a surface of the reservoir 104 of the position of the moving bed assembly 102 and/or providing access to a line for raising the moving bed assembly 102 out of the reservoir 104. In other embodiments, the moving bed assembly 102 may further include an anchor (not shown) to provide added density and stability to the assembly 102 resting at the bed 116 of the reservoir 104.

In the example embodiment, a single moving bed assembly 102 is illustrated in FIG. 1 in the reservoir 104. In other embodiments, the wastewater treatment system 100 may include any suitable number of moving bed assemblies. For example, in some embodiments, the reservoir 104 includes between five and fifty moving bed assemblies, that are each substantially the same as assembly 102, which cooperatively perform a wastewater treatment process on water within the reservoir 104. In some such embodiments, different configurations (i.e., number and type) of media 120 may be used for different moving bed assemblies in the reservoir 104, depending on their relational position to the inlet 108 and outlet 110. The moving bed assemblies can be located strategically to target reduction of carbon, ammonia, other forms of nitrogen, or ratios thereof depending on their placement within the reservoir 104. In some embodiments, where multiple moving bed assemblies are used, baffles (not shown) may be provided to direct hydraulic flow path in the reservoir 104 between the different moving bed assemblies.

In the example embodiment, the wastewater treatment system 100 includes an air supply unit 122, such as a blower or air compressor in the example embodiment, that provides compressed or pressurized air to an air supply hose 124. The air supply unit 122 and the air supply hose 124 collectively provide a flow of air to the moving bed assembly 102. The air supply unit 122 is positioned outside of the reservoir 104 and the air supply hose 124 extends from the air supply unit 122 to the moving bed assembly 102. In embodiments where the wastewater treatment system 100 includes a plurality of moving bed assemblies, the air supply hose 124 may include one or more junctions (not shown) to provide air to each of the different moving bed assemblies and/or one or more additional air supply units may be used.

The air supply unit 122 is selectively controllable and variable to provide the air supply at a desired air flow parameter, such air flow rate and/or air pressure to the moving bed assembly 102. For example, the speed of the blower may be adjusted based on a desired amount of oxygen (e.g., in parts per million) that should be added to the water (which may vary based on which elements are being removed in the MBBR process). The air flow provided by the air supply unit 122 generates a turbulent and mixing fluid flow in the aqueous environment, indicated by the flow lines 126, around and within the moving bed assembly 102. The air flow parameter is set to create an airlift within and around the moving bed assembly 102 that provides turnover of the fluid in and around the moving bed assembly 102, as shown by the turbulent flow arrows 137 in FIG. 1.

The turbulent flow 137 of fluid in and around the moving bed assembly 102 causes fluid 107 to be processed through the moving bed assembly 102 over a time period, referred to herein as an average actual hydraulic retention time. As used herein, the average actual hydraulic retention time refers to the time in which an example volume of wastewater is captured within the turbulent flow of the moving bed assembly 102 such that the fluid 107 is processed through the moving bed assembly 102 before exiting the moving bed assembly 102 and flowing towards the outlet 110 for example. As wastewater fluid 107 enters the turbulent flow 137, as shown by the flow line 135 in FIG. 1, the wastewater 107 may be cycled several times repeatedly through the moving bed assembly 102 along the turbulent flow 137, being directed through the bottom 128 and/or sides 130 of the assembly 102 and exiting through the top 132 of the assembly 102, before exiting the turbulent flow 137 and resuming a natural flow along the flow line 139 towards the outlet 110. In the example embodiment, the air flow rate is set such that the average actual hydraulic retention time of fluid through the moving bed assembly 102 is substantially the same as a theoretical hydraulic retention time for MBBR processes. The flow of air through the assembly 102 provides an air lift effect that increases an effective pumping rate of the surrounding wastewater through the unit. In the example embodiment, the air flow rate is further set such that the effective pumping rate through the modular units is at least double and/or at least tripe an average flow rate of wastewater in the surrounding environment (i.e., the natural flow rate of wastewater in the surrounding environment absent the airflow being provided). The effective pumping rate of wastewater through the assembly 102 reduces the potential for short circuiting.

Figure 2:
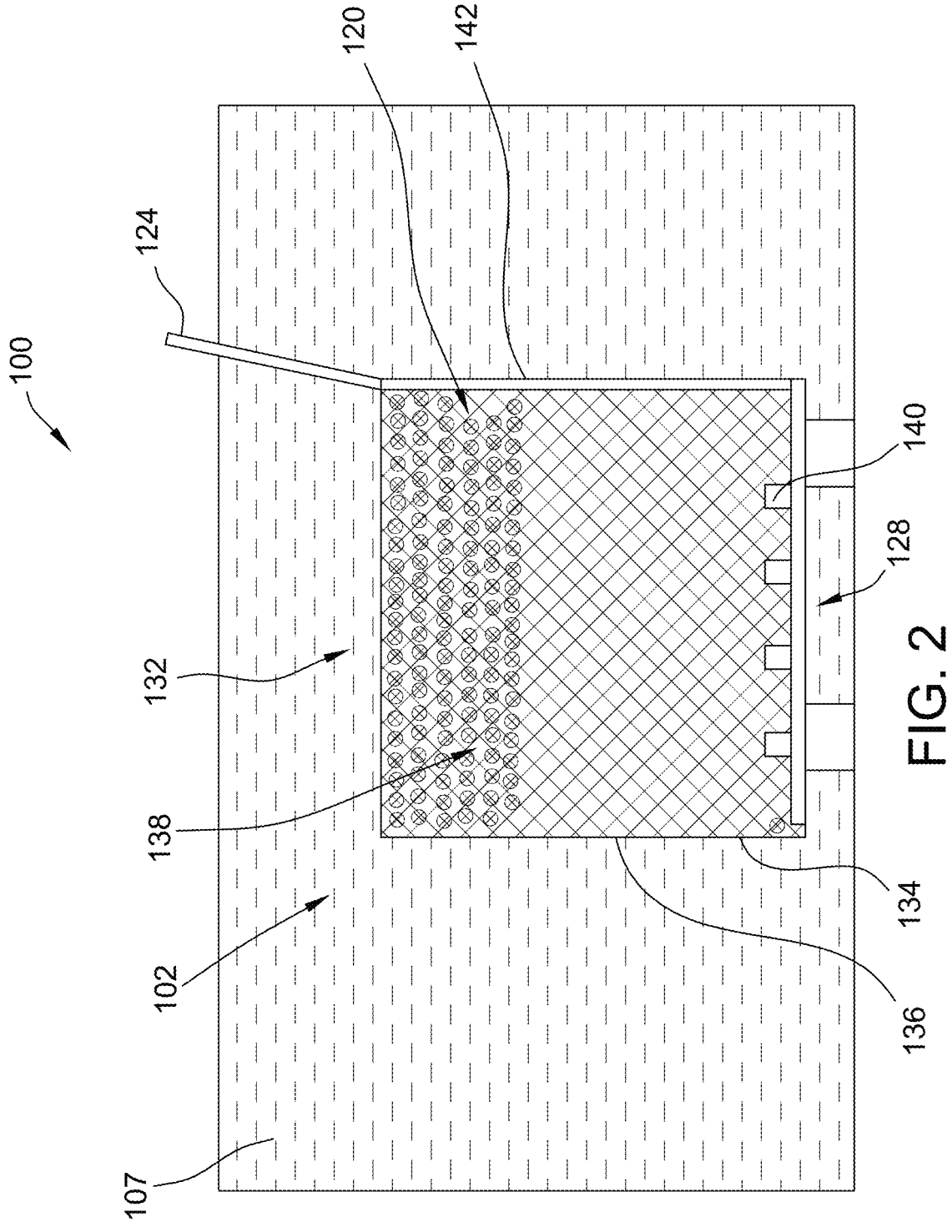
FIG. 2 is an enlarged schematic of the wastewater treatment system shown in FIG. 1, showing the moving bed assembly in a non-aerated state.
Figure 3:
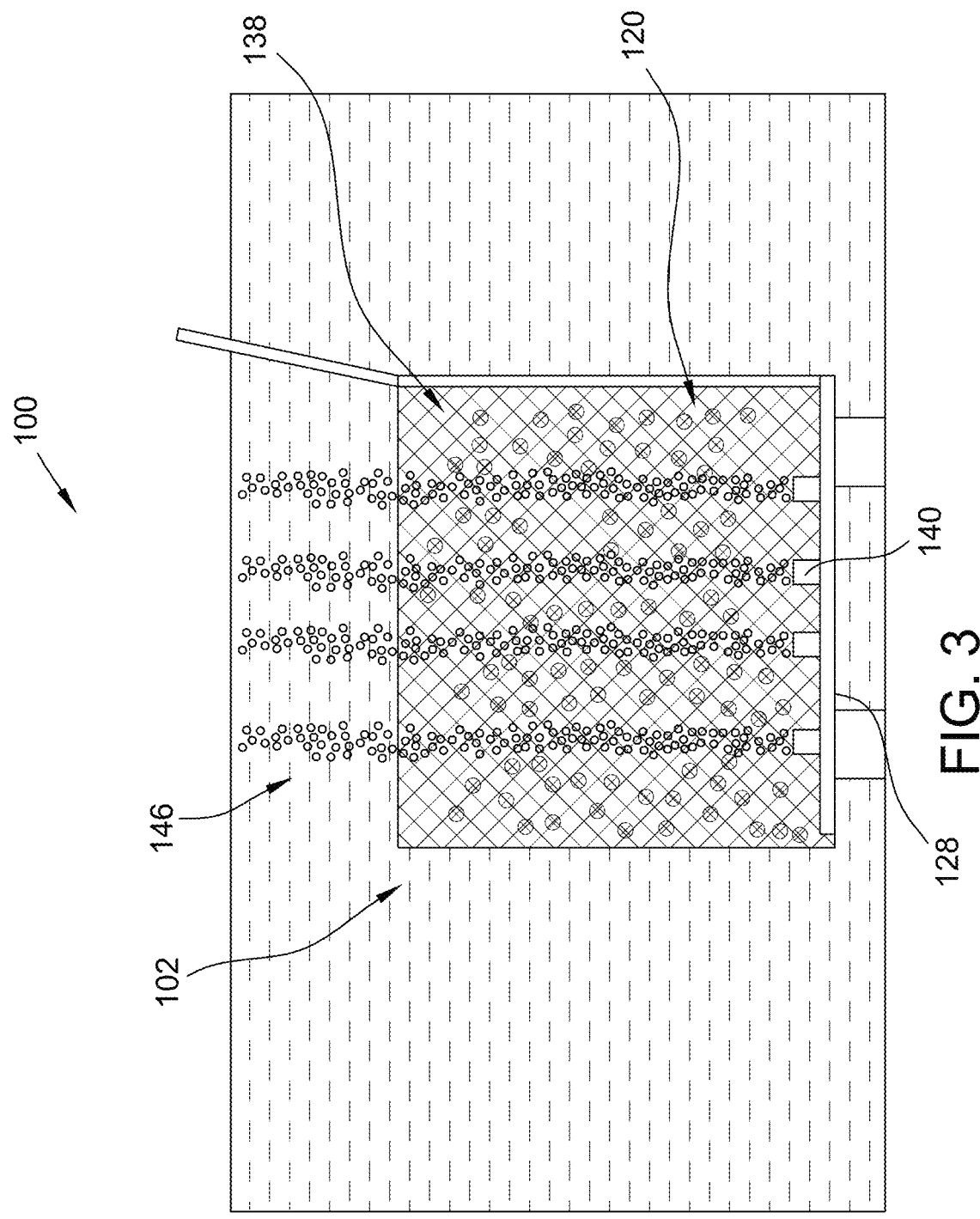
FIG. 3 is a schematic of the wastewater treatment system shown in FIG. 2, showing the moving bed assembly in an aerated state.

FIG. 2 is a schematic enlarged view of the wastewater treatment system 100 shown in FIG. 1, showing the moving bed assembly 102 in an unaerated state. FIG. 3 is a schematic enlarged view of the wastewater treatment system 100 shown in FIG. 1, showing the moving bed assembly 102 in an aerated state. As used herein, the unaerated state or "off state" of the moving bed assembly 102 refers to the state in which the air supply unit 122 (shown in FIG. 1) is off or otherwise air is not being actively provided to the diffusers 140 and released within the moving bed assembly 102. The aerated state or "on state" refers to the state in which the air supply unit 122 is actuated and coarse bubble aeration is provided to the interior of the moving bed assembly 102.

Referring to FIG. 2, in the example embodiment, the moving bed assembly 102 includes a frame housing 134 and a plurality of retention screens 136 coupled to the frame housing 134. The retention screens 136 at least partially define an interior 138 of the moving bed assembly 102. Biocarrier media 120 are contained within the moving bed assembly 102 by retention screens 136. As used herein, the "interior" of the moving bed assembly 102 refers to the space defined within the frame housing 134 and the retention screens 136 in which the media 120 are retained. In the example embodiment, the biocarrier media 120 have a density that is less than the density of fluid 107 in the surrounding aqueous environment (e.g., water). As a result, the media 120 floats to a top end 132 of the moving bed assembly 102 and is retained by the retention screens 136 within the moving bed assembly 102, when the moving bed assembly 102 is in the non-aerated state.

In the example embodiment, the frame housing 134 has a generally cube shape and the retention screens 136 collectively extend across and at least partially defines all six sides of the moving bed assembly 102, such that fluid may flow into and out of the interior 138 of the moving bed assembly 102. Specifically, the retention screens 136 are porous and define openings (e.g., the diamond shaped white space in FIG. 2) that are sized to restrict biocarrier media 120 from exiting the interior 138 of the moving bed assembly 102. In other embodiments, at least one or more of the sides and/or at least a portion of one of the sides of the moving bed assembly 102 may be non-porous (e.g., a solid plate).

The retention screens 136 of the moving bed assembly 102 define a volume of the interior 138 in which the biocarrier media 120 move freely within and which the media 120 are restricted from exiting. In the example embodiment, the moving bed assembly 102 has a media 120 fill ratio of between 30% and 70% of the volume in the interior 138. That is, the media 120 collectively occupy between 30% and 70% of the volume of the interior 138, with the remaining volume (between 70% and 30%) being filled with the water in which the assembly 102 is placed. The carrier media 120 have an effective surface area in a range of 500-1,000 square meters per cubic meter ("m²/m³").

The moving bed assembly 102 further includes diffusers 140 coupled to the frame housing 134 and in flow communication with the air supply hose 124. The air supply hose 124 is coupled to an air supply tube 142 that is attached to the frame housing 134 and which extends between the air supply hose 124 and the diffusers 140 and diffuser laterals 158 (shown in FIG. 6). In the example embodiment, the diffusers 140 are coarse bubble diffusers and provide coarse bubble aeration within the interior 138 of the moving bed assembly 102, as shown in FIG. 3. In the example embodiment, the moving bed assembly 102 includes eight diffusers 140 (shown in FIG. 6) positioned at or adjacent the bottom side 128 of the moving bed assembly 102 (i.e., the side of the moving bed assembly 102 that is adjacent to and oriented to face the bed in FIG. 1). In other embodiments, the moving bed assembly 102 may include any suitable number of diffusers 140 including, for example and without limitation, between 2 and 20 diffusers, between 4 and 30 diffusers, between 2 and 16 diffusers, between 4 and 20 diffusers, between 2 and 10 diffusers, between 4 and 16 diffusers, 2 diffusers, 3 diffusers, 4 diffusers, 5 diffusers, 6 diffusers, 7 diffusers, 9 diffusers, 10 diffusers, 11 diffusers, 12 diffusers, or any other suitable number of diffusers 140.

Referring to FIG. 3, when the air supply unit 122 (shown in FIG. 1) is turned on or actuated, the diffusers 140 output coarse bubbles 146 into the interior 138 of the moving bed assembly 102. The bubbles 146 provide continuous agitation (i.e., impart motion to) the carrier media 120. The media 120 provide surface area for biological microorganisms in the wastewater to attach and grow to. The diffusers 140 and media 120 further cooperate to achieve medium bubble diffuser oxygen transfer efficiency. The media 120 increase oxygen transfer efficiency by at least between about 10-40%, as compared to operation of the assembly 102 without use of media 120. Additionally, the frame housing 134 and retention screens 136 further increase the oxygen transfer efficiency of the assembly 102, as bubbles 146 are also disturbed by the retention screen 136 and are directed into openings of the retention screens 136 during use. Although the bubbles 146 are depicted in a linear column formation, the media 120 may disrupt the rising path of the bubbles 146 in the water such that the bubbles 146 are evenly distributed at the surface of the moving bed assembly 102.

Figure 4:
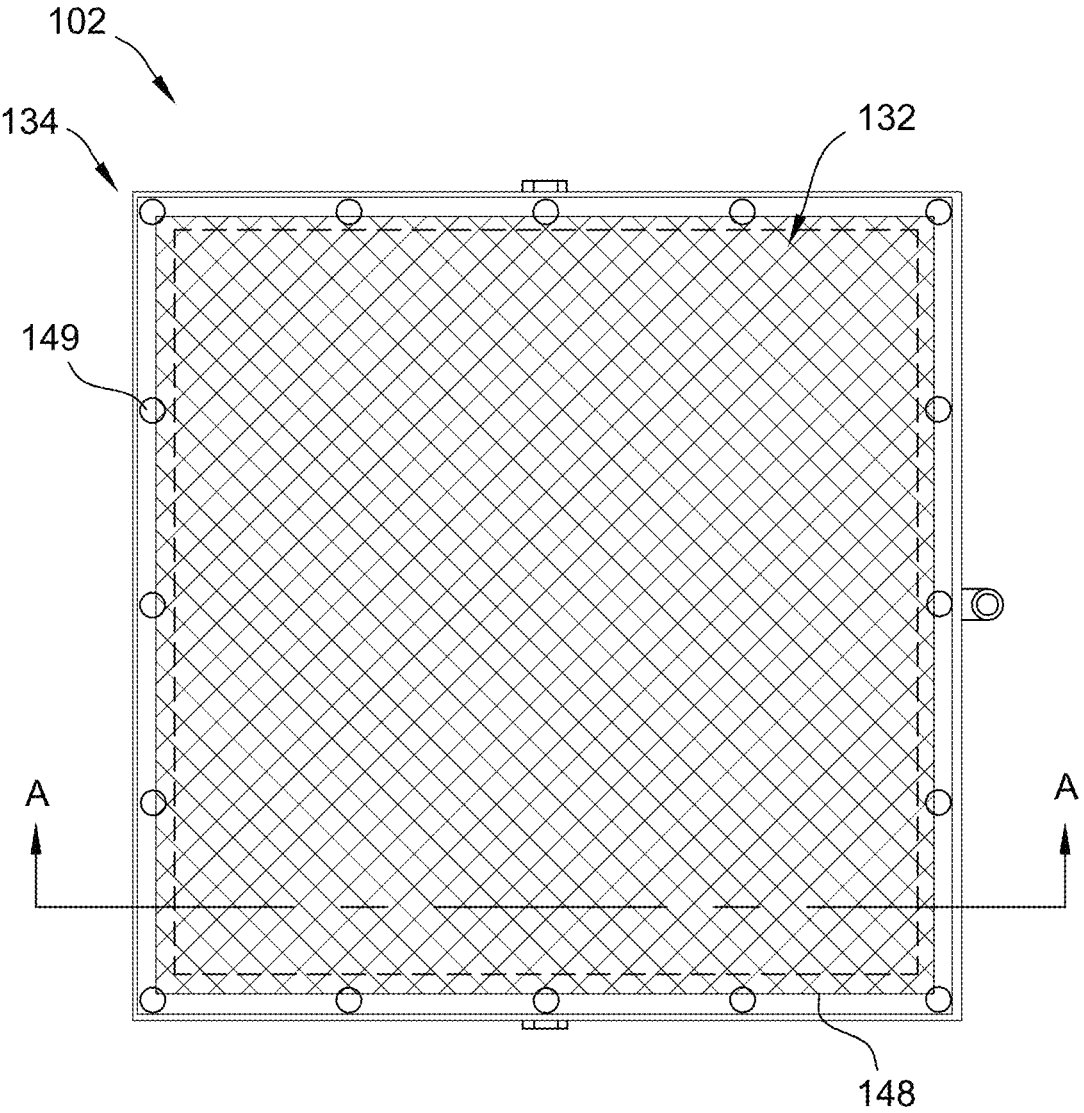
FIG. 4 is a schematic top view of the moving bed assembly shown in FIGS. 1-3.
Figure 5:
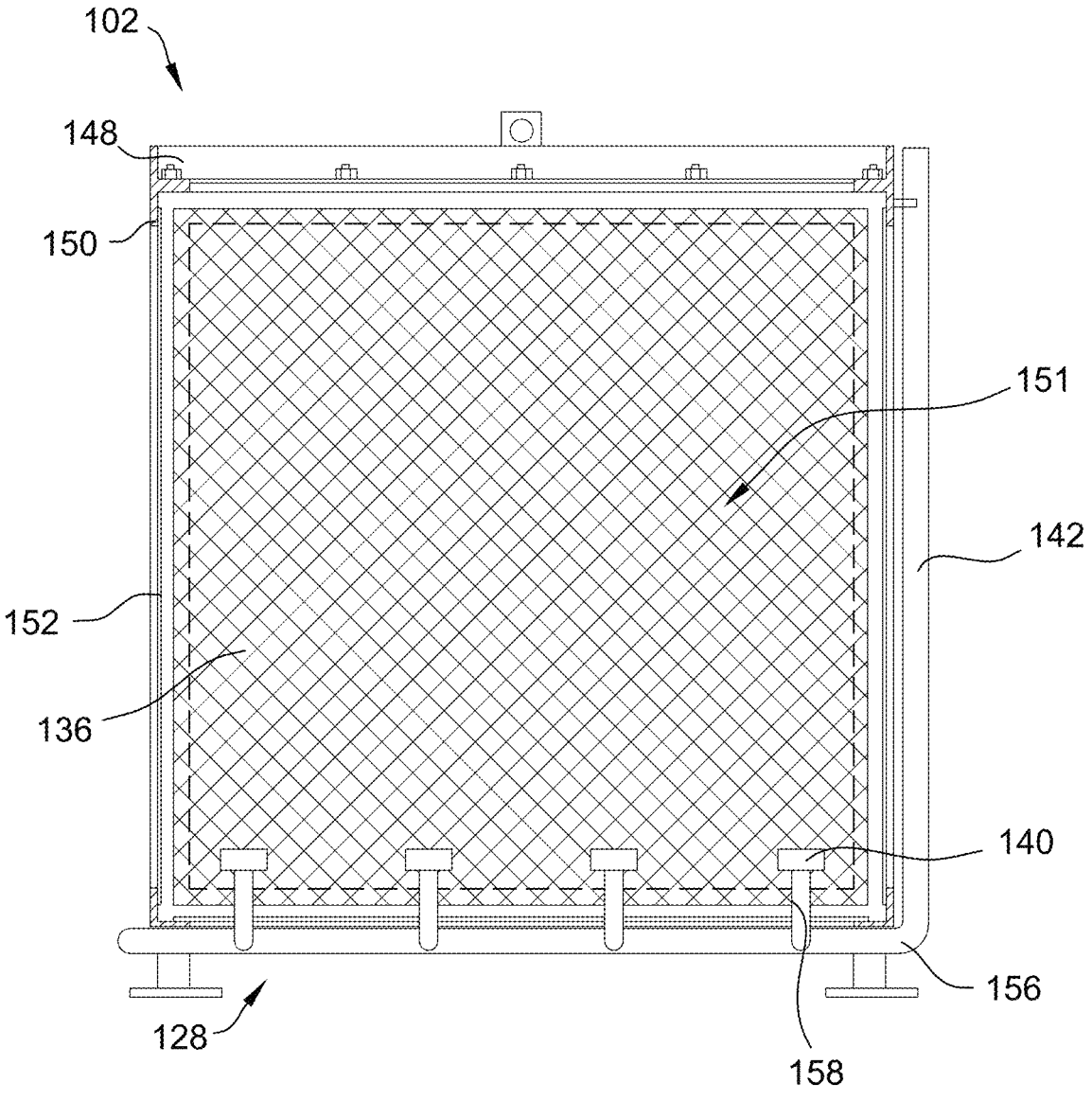
FIG. 5 is a schematic cross section of the moving bed assembly shown in FIG. 4 taken along the line A in FIG. 4.
Figure 6:
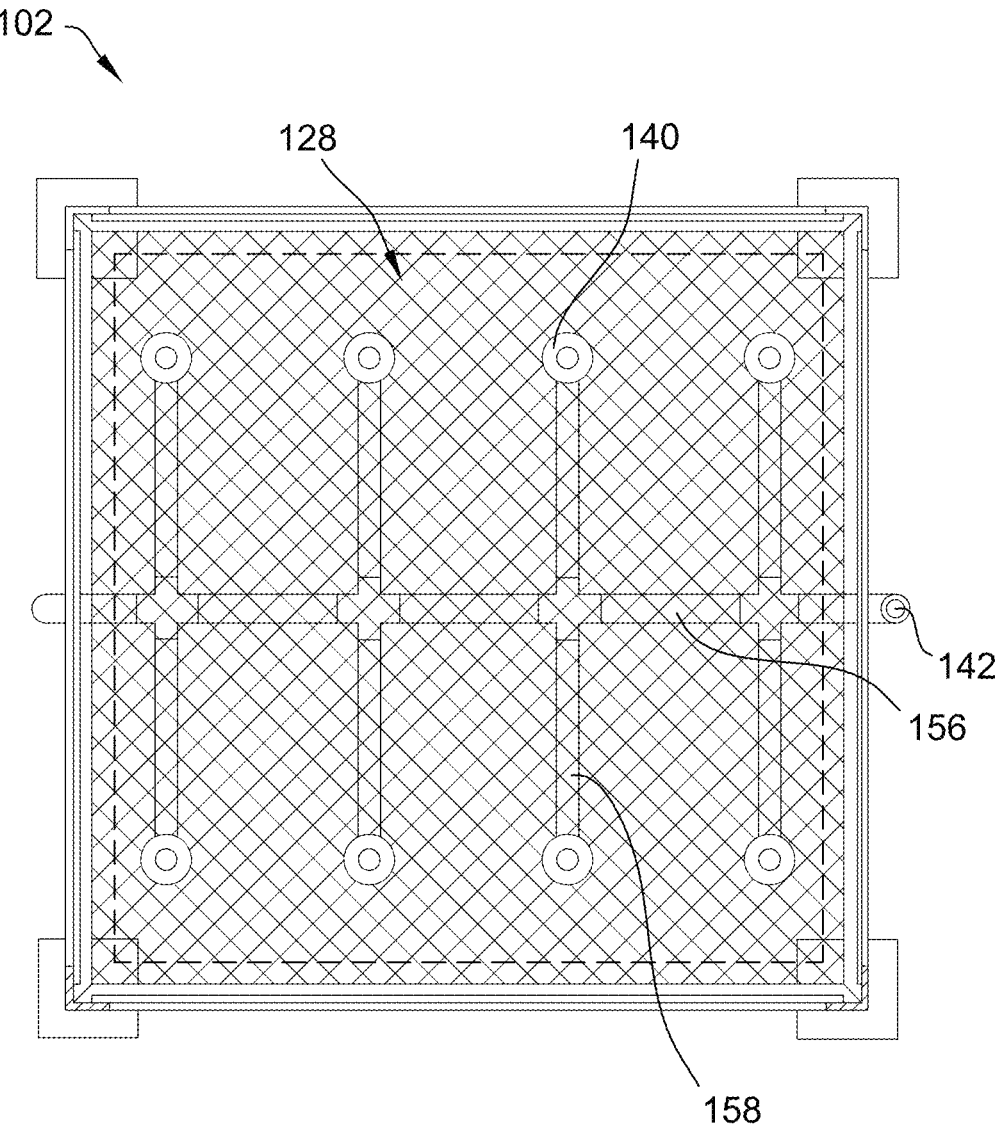
FIG. 6 is a schematic bottom view of the moving bed assembly shown in FIG. 4.

FIG. 4 is a top schematic view of the moving bed assembly 102 of FIG. 1. FIG. 5 is a cross section of the moving bed assembly 102 of FIG. 4, taken along the line A, shown in FIG. 4. FIG. 6 is a bottom view of the moving bed assembly 102 of FIG. 4.

Referring to FIG. 4, a top side 132 of the moving bed assembly 102 is shown. The top side 132 includes an access cover 148 of the frame housing 134 that is attached to a frame body 150 (shown in FIG. 5) of the frame housing 134. The access cover 148 is bolted to the frame body 150 by fasteners 149 (e.g., nuts and bolts).

Referring to FIG. 5, the frame body 150 includes six frame sides 152, each having a generally square profile with an interior opening 151 defined therein. The frame sides 152 are each welded to one another to form the overall cube shape of the frame body 150. Although the frame body 150 is shown and described as being a cube shape in the example embodiment, it should be understood that the frame body 150 and corresponding retention screens 136 may have any suitable shape that enables the moving bed assembly 102 to function as described herein. In some embodiments, for example, the moving bed assembly 102 may be shaped as a rectangular prism, and one or more of the retention screens 136 may be rectangle shaped. In yet other embodiments, the moving bed assembly 102 may be shaped as a polygonal prism (e.g., a pentagonal prism, a hexagonal prism, an octagonal prism, etc.), and one or more of the retention screens 136 may be shaped as a polygon.

The retention screens 136 each extend across a respective one of the interior openings 151 of the frame sides 152. The frame housing 134 further includes pedestals 154 (four in the example embodiment) coupled to the frame body 150 at the bottom side 128 of the assembly 102 opposite the top side 132 at or adjacent to each of the corners of the bottom side 128, as shown in FIG. 6. In some embodiments, one or more sides of the moving bed assembly 102 may include solid sheet metal in addition to or alternatively to the retention screens 136.

Referring to FIGS. 5 and 6, the air supply tube 142 extends at least partially beneath the bottom side 128 of the moving bed assembly 102, or more specifically, beneath the frame body 150. The air supply tube 142 includes an air header 156 and laterals 158 supplying air to the bubble diffusers 140. The diffusers 140 are each coarse bubble diffusers 140 that are attached to the air supply tube 142 at distal ends of the laterals 158. The air header 156 is sized and shaped such that the diffusers 140 are generally equidistantly spaced from adjacent diffusers 140 in a lateral direction (i.e., left to right in FIG. 6) and are each equidistantly spaced from a corresponding diffuser 140 in the transverse direction (i.e., vertical direction in FIG. 6). As a result, the bubbles 146 (shown in FIG. 3) provided by the diffusers 140 provide a generally evenly distributed agitation to the carrier media 120 positioned within the interior 138. In other embodiments, the air supply tube 142 may have any suitable configuration that enables the moving bed assembly 102 to function as described herein.

Figure 7:
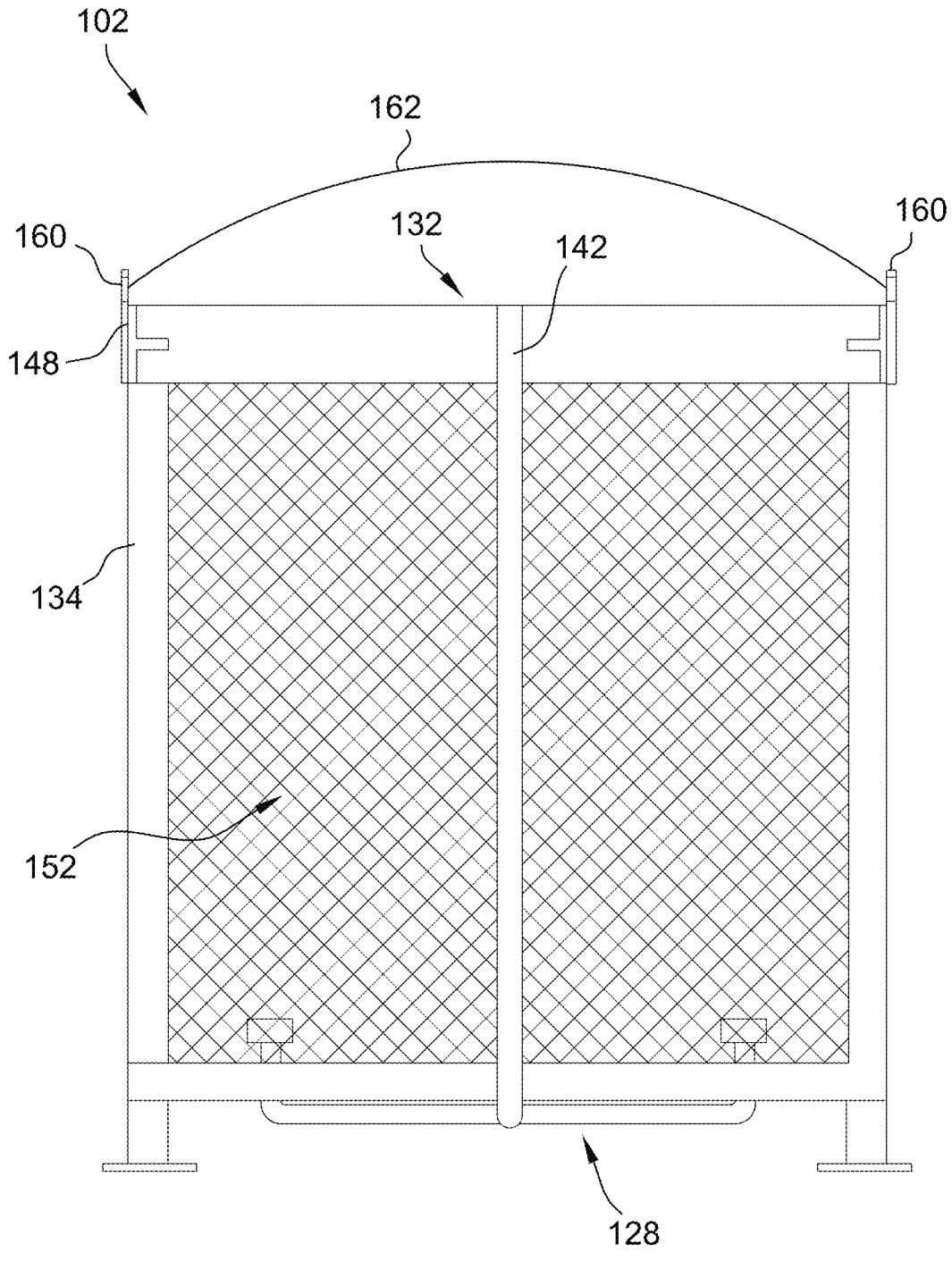
FIG. 7 is a schematic side view of the moving bed assembly shown in FIG. 4.

As shown in FIG. 7, in the example embodiment, the air supply tube 142 is attached to the frame housing 134 on one of the frame sides 152 and extends along the frame housing 134 from the top side 132 to the bottom side 128. The access cover 148 includes a pair of lifting lugs 160 at opposed ends of the top side 132. A line 162 extends between and is attached to each of the lugs 160 for securing a visual marker (e.g., a buoy) thereto.

In the example embodiment, the air supply header 142, the retention screen, the frame body 150, the access cover 148, and the fasteners (e.g., nuts and bolts) are each constructed of stainless steel ("SS"). In other embodiments, the components of the moving bed assembly 102 may be formed of any suitable material that enables the moving bed assembly 102 to function as described herein.

One technical benefit provided by embodiments of the disclosure include improved control over naturally occurring biology in lagoons without changes to the environment. For example, the addition of mobile, supplemental biology can significantly improve the control over the characteristics of the naturally occurring biology in a lagoon by allowing the lagoon to serve more of a supplemental or polishing function. The moving bed module can be located strategically to target reduction of carbon, ammonia nitrogen, or ratios thereof depending on placement within the lagoon system. The use of supplemental biology within the moving bed modules reduces constituent levels and the naturally occurring lagoon biology will adapt to the changes in concentration to polish the lagoon wastewater to lower constituent levels.

Another technical benefit provided by embodiments of the disclosure is improved mixing conditions in a lagoon or tank. The addition of mobile, moving bed module results in significant air lift pumping of the wastewater in the vicinity of the assembly 102, improving mixing conditions and the effective hydraulic retention time in the lagoon or tank. For example, the turbulent flow around the assembly 102 that is generated from the airflow through the diffusers 140 provides control over the hydraulic flow path in lagoons.

Another technical benefit provided by embodiments of the disclosure is improved control over the dissolved oxygen levels in lagoons/tanks. For example, in contrast with systems that use mechanical aeration or fine bubble diffused aeration to add air and transfer oxygen into wastewater, the moving bed assemblies of the present disclosure can be used to replace these and other forms of aeration and require less maintenance overall because of its use of MBBR media 120 and because of its use of coarse bubble diffusers 140. The media 120 allows for supplemental biological growth that reduces the oxygen demand required in other portions of the lagoon. The combination of coarse bubble diffusers 140 and MBBR media 120 used in MBBRs has been shown to achieve medium bubble diffuser oxygen transfer efficiency performance at least partially due to the interference in the upward path of the bubbles 146 resulting from the media 120. Because coarse diffuser performance does not markedly change over time, and coarse bubble diffuser replacement is not typically required, the use of moving bed assemblies to achieve aeration goals can reduce maintenance activity requirements relative to other lagoon-based wastewater treatment system 100s. Some moving bed assemblies of the present disclosure are designed to produce a high residual dissolved oxygen level within the moving bed. Effluent from moving bed modules that target a high residual oxygen concentration is released into the lagoon and can provide significant volumes of supplemental dissolved oxygen that can improve performance of lagoon-based biology that is outside of the module.

In pre-equalization tanks, moving bed assemblies may be used to retain a pretreatment benefit (without the use of a recycled return activated sludge to the aeration tank) by retaining biological fixed film on the moving bed carrier media 120, while also improving mixing conditions and elevating the dissolved oxygen levels (with low maintenance coarse diffusers 140 and MBBR media 120) to reduce the impact of odor or septicity in the plant or downstream biological treatment system. Equalization tank water levels typically vary, but with small assemblies supported off the floor, moving bed assemblies may consistently provide carbon reduction for pretreatment, reduce septicity, oxidize odor, and elevate dissolved oxygen levels.

In some embodiments, the moving bed assemblies may be used in roughing/pretreatment tanks or "A-stage" tanks used as first stage of treatment in municipal, industrial or other high strength treatment. The moving bed assemblies may provide suspended growth and the higher kinetic rates of removal observed in moving bed biological reactor systems, when used in such tanks.

In some embodiments, the moving bed assemblies may be used in centrate/filtrate treatment tanks. Such tanks often rely exclusively on activated sludge forms of mixed liquor to reduce ammonia nitrogen downstream of dewatering of anaerobically digested sludge. In such embodiments, the moving bed assemblies may add supplemental fixed film to retain autotrophic biology and limit the potential loss of suspended growth autotrophs (without retrofitting the centrate/filtrate treatment tanks into MBBR or IFAS tanks). Therefore, moving bed assemblies could significantly reduce constructability challenges and cost of centrate treatment using MBBR or integrated fixed film activated sludge processes.

In activated sludge that does not currently utilize fixed film, the addition of moving bed assemblies effectively converts the system into an integrated fixed film activated sludge system without retrofitting the tank, changing the hydraulic profile, or possibly without even taking the tank off-line. In such embodiments, the moving bed assembly 102 could be located near the front end of an existing plug flow activated sludge system to target improvements to carbon reduction, near the end of the plug flow system to target improvements to ammonia, nitrogen, or a combination thereof.

In recirculating sand filtration facilities, the use of moving bed assemblies within either the septic tank or recirculation/dosing tanks could be added to supplement the treatment process with minimal constructability challenges, while increasing the performance potential of the system significantly.

In post aeration tanks, the addition of moving bed assemblies could both increase the dissolved oxygen levels and polish ammonia, without the conversion of existing tankage into MBBR. The yield coefficient for MBBR autotrophs has been shown to be low, allowing for the addition of MBBR for ammonia polishing without a significant increase in sludge or effluent TSS levels.

Exemplary embodiments of systems and methods for wastewater treatment are described above in detail. The methods and apparatus are not limited to the specific embodiments described herein, but rather, components of systems and/or steps of the methods may be utilized independently and separately from other components and/or steps described herein. For example, the systems and methods may also be used in combination with other wastewater system and methods, and are not limited to practice with only the lagoon as described herein. Rather, the example moving bed assembly can be implemented and utilized in connection with many other wastewater systems.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of treating a fluid having an average flow rate within a reservoir, the method comprising:

filling an interior of a moving bed assembly with a biocarrier media, the moving bed assembly including a frame housing, a retention screen coupled to the frame housing and extending at least partially across one side of the frame housing, the frame housing and the retention screen cooperatively defining the interior of the moving bed assembly, wherein a fill ratio of a volume of the biocarrier media to a total volume of the interior of the moving bed assembly is between 30% and 70%; and sinking the moving bed assembly in the reservoir such that the moving bed assembly is rested in position within the reservoir;

supplying, after said sinking, air from an air supply unit to a diffuser and to the interior of the moving bed assembly, the diffuser being coupled to the frame housing, wherein the supply of air generates a turbulent flow of the fluid circulating between the interior and the reservoir and agitates the biocarrier media within the interior of the moving bed assembly, the circulating flow of the fluid causing a wastewater portion of the fluid to be repeatedly cycled through the interior to form a processed portion of the fluid, the circulating flow further causing the processed portion of the fluid to exit the moving bed assembly; and controlling the air supply unit to generate an effective pumping rate of the circulating flow that is at least double an average flow rate of the fluid within the reservoir.

2. The method of claim 1, wherein the frame housing defines a plurality of sides and wherein the moving bed assembly further includes a plurality of retention screens, wherein one of the plurality of retention screens is positioned on each side of the plurality of sides.

3. The method of claim 2, wherein each of the retention screens include openings.

4. The method of claim 1, wherein the diffuser is coupled to a bottom of the frame housing and directs the air through an opposed top of the frame housing into the reservoir.

5. The method of claim 4, wherein the air supply unit is positioned outside of the reservoir and, wherein the moving bed assembly further includes an air supply hose coupling the air supply unit to the diffuser.

6. The method of claim 5, wherein the circulating flow of fluid cycles from the interior of the moving bed assembly, through a top of the frame housing, and through at least one of a side and a bottom of the frame housing.

7. The method of claim 1, wherein said sinking the moving bed assembly includes sinking the moving bed assembly in the reservoir such that the moving bed assembly is seated upright on a bed of the reservoir.

8. The method of claim 1, wherein said supplying air from the diffuser includes performing a moving bed biological reactor ("MBBR") treatment to the fluid of the reservoir, the MBBR treatment including at least one of biochemical oxygen demand ("BOD") removal, chemical oxygen demand ("COD") removal, nitrification, and denitrification.

9. The method of claim 1, wherein the effective pumping rate of the circulating flow through the moving bed assembly is at least triple the average flow rate of the fluid within the reservoir.

10. The method of claim 1 further comprising:

directing the fluid into the reservoir through an inlet positioned at a first end of the reservoir; and receiving the processed portion of the fluid at an outlet positioned at a second end of the reservoir.

11. The method of claim 10, wherein the moving bed assembly is positioned within the reservoir downstream of the inlet and upstream of the outlet.

12. The method of claim 11, wherein the processed portion of the fluid resumes a natural flow within the reservoir and toward the outlet after exiting the moving bed assembly.

13. The method of claim 12, wherein supplying air from the diffuser includes performing a moving bed biological reactor ("MBBR") treatment to the fluid of the reservoir, the MBBR treatment including at least one of biochemical oxygen demand ("BOD") removal, chemical oxygen demand ("COD") removal, nitrification, and denitrification, and wherein an average actual hydraulic retention time in which the fluid is processed through the moving bed assembly by the circulating flow before exiting the moving bed assembly is substantially the same as a theoretical hydraulic retention time for the MBBR treatment.

* * * * *